Sept. 7, 1965     F. R. SCHUBERT     3,205,020

BRAKE MECHANISM

Filed Aug. 14, 1963     3 Sheets-Sheet 1

INVENTOR

FRANK R. SCHUBERT

BY *Scrivener & Parker*

ATTORNEYS

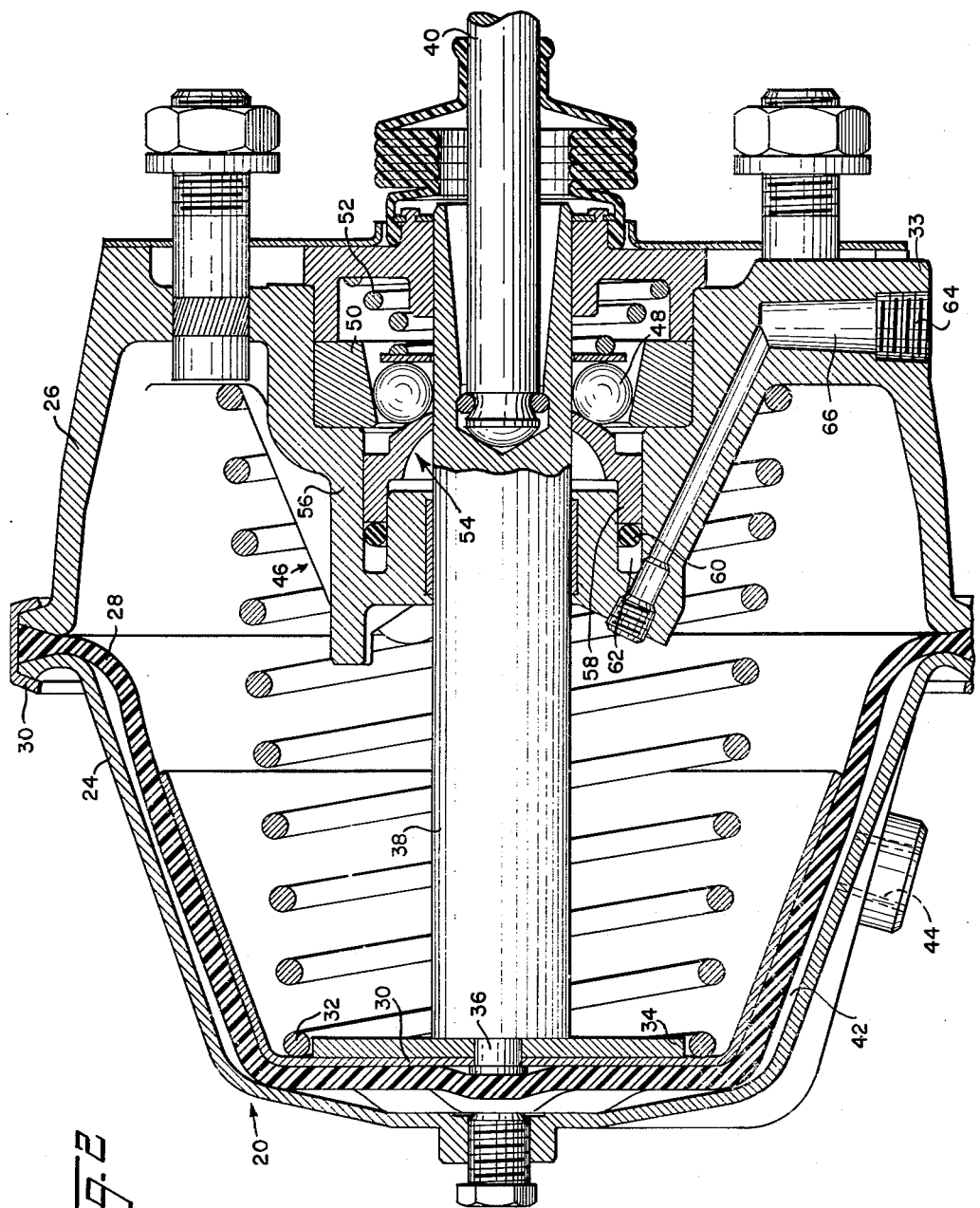

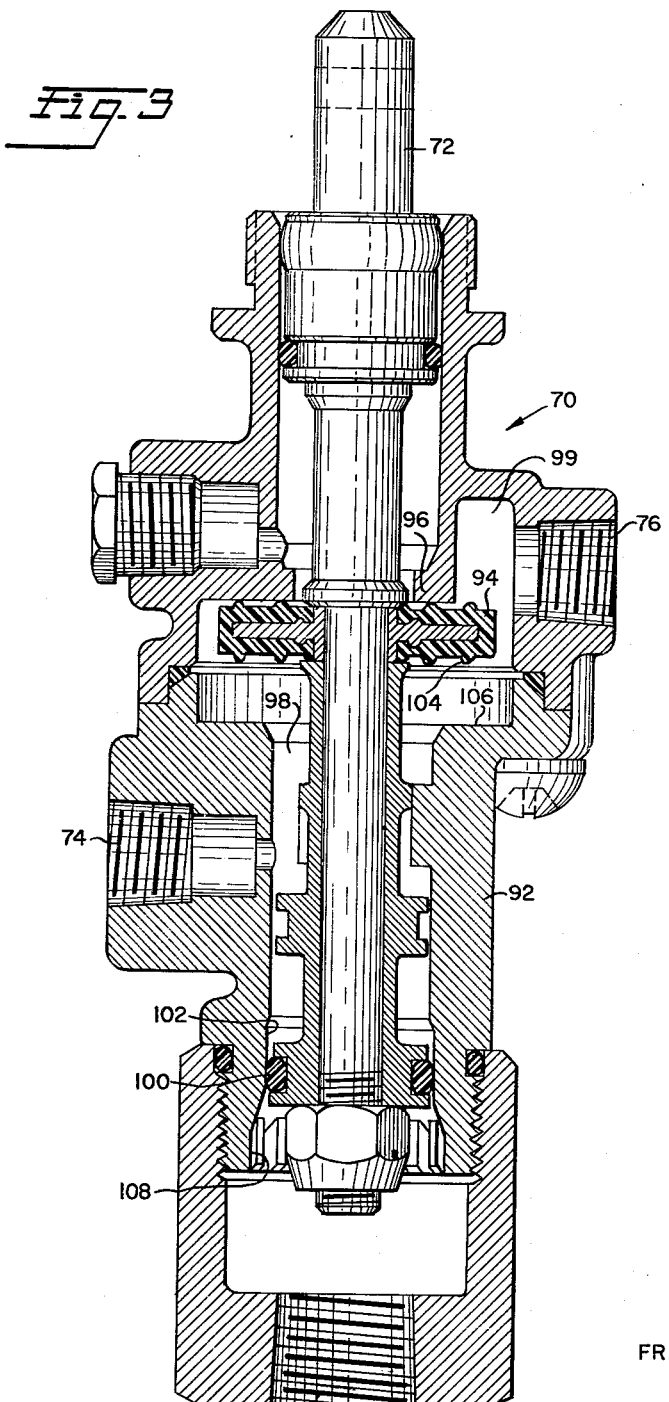

United States Patent Office

3,205,020
Patented Sept. 7, 1965

3,205,020
BRAKE MECHANISM
Frank R. Schubert, Elyria, Ohio, assignor to Bendix-Westinghouse Automotive Air Brake Company, Elyria, Ohio, a corporation of Delaware
Filed Aug. 14, 1963, Ser. No. 302,047
6 Claims. (Cl. 303—29)

This invention relates to brake mechanisms for trailer vehicles and more particularly to a safety and parking brake mechanism for trailers equipped with air brake systems.

Conventional compressed air braking systems for tractor-trailer vehicles are so constructed that when the vehicles are uncoupled, the trailer brakes are automatically applied. Thereafter, should the trailer brake system pressure be lost, due to leakage for example, the trailer brakes will be released, so that some safeguards must be taken to insure that the trailer will remain in its brake-applied or parked position.

The principal object of the present invention is to provide a novel trailer brake system which is constituted in such a manner that upon a decrease of air pressure in the trailer brake system to a predetermined value, when the trailer is disconnected from the tractor, the trailer brakes will be automatically applied and locked in the applied position, thus insuring that the uncoupled trailer will remain in a parked and safe condition.

Another object is to provide in a system of the above type, a novel trailer brake control system wherein the automatic emergency application of the brakes will occur, when there is a break-in-two of the coupled vehicles, and such emergency application will not be locked in applied condition until the trailer brake system pressure drops to a predetermined value.

A further object is to provide a trailer brake system of the foregoing character wherein the automatic emergency application of the trailer brakes may be readily released in order that the uncoupled trailer may be moved for loading or unloading operations.

A still further object is to provide a trailer brake system wherein the trailer brakes are automatically released when the trailer is recoupled to the tractor.

The above and other objects of the invention will appear more fully hereinafter from a consideration of the following detailed description when taken in connection with the accompanying drawings. It is to be expressly understood however, that the drawings are utilized for purposes of illustration only, and are not designed as a definition of the limits of the invention, reference being had for this latter purpose to the appended claims.

Referring to the drawings, wherein similar reference characters refer to similar parts throughout the several views:

FIG. 2 is a sectional view of one of the trailer brake actuators of FIG. 1, and

FIG. 3 is a sectional view of the control valve mechanism.

Figure 1:
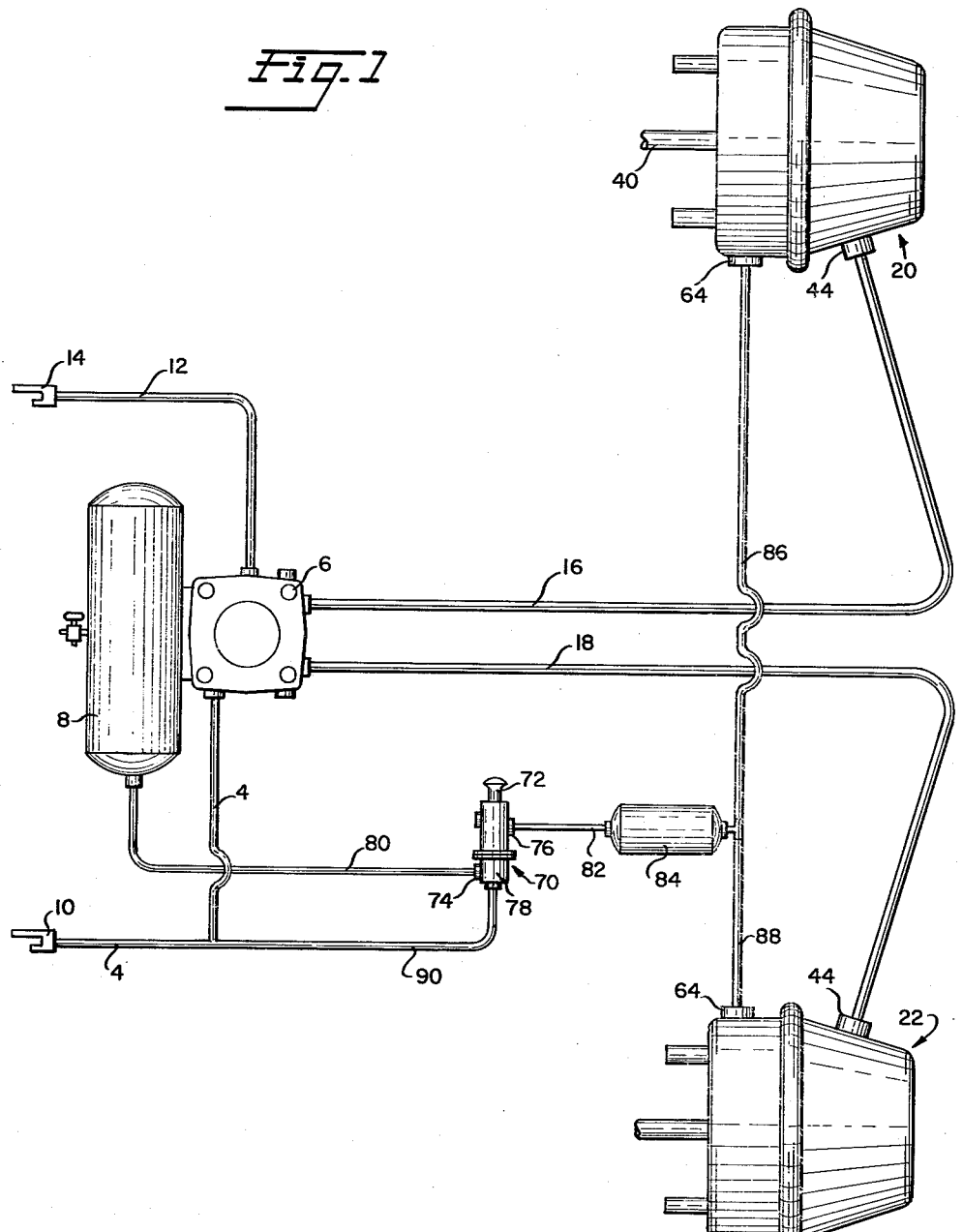
FIG. 1 is a diagrammatic view of a compressed air operated trailer brake system constructed in accordance with the principles of the present invention.

Referring to FIG. 1, the present invention is illustrated therein in connection with a conventional type of compressed air braking system which includes an emergency conduit 4 which is connected through a relay emergency valve 6 to supply compressed air to a trailer reservoir 8 in the usual manner, when the trailer is connected with the tractor by means of the conventional coupling 10. A service conduit 12 provided with a coupling member 14 for connection with the tractor service conduit, is connected with the relay emergency valve 6 in order to supply compressed air from the reservoir 8 through conduits 16 and 18 to trailer brake actuators 20 and 22. The relay emergency valve 6 is of conventional form and may be constructed as shown in the patent to Charles E. Gates No. 2,937,052 dated May 17, 1960.

With the above arrangement, when the trailer emergency and service conduits 4 and 12 respectively, are connected with the associated tractor emergency and service conduits, the trailer reservoir 8 is charged with compressed air through the emergency conduit 4 and the relay emergency valve 6. With the vehicles thus coupled, service application of the trailer brake actuators 20 and 22 is effected by operation of the tractor brake valve and charging of the trailer service conduit 12. The relay emergency valve 6 is then responsive to service conduit pressure in order to graduate the application of compressed air from the trailer reservoir 8 to the trailer brake actuators 20 and 22.

Also, as well understood in the art, should the trailer emergency conduit 4 be disconnected from the tractor emergency conduit, as by means of a break-in-two of the vehicles or by manual uncoupling of the coupling member 10, the relay emergency valve 6 will function to charge the trailer brake actuators 20 and 22 with full reservoir pressure from the trailer reservoir 8 by way of the conduits 16 and 18. Thus, the trailer brakes will be automatically applied. However, if the trailer is parked under such conditions, and the trailer reservoir pressure is lost, due to leakage for example, the trailer brakes will be released. Furthermore, with the conventional system, if it is desired to maneuver the parked trailer, it is necessary to recouple the tractor and trailer in order to recharge the trailer reservoir for the purpose of releasing the trailer brakes.

In the present invention, the conventional trailer brake system above described is so arranged as to provide a novel arrangement which is so constructed and arranged as to overcome the above difficulties.

Referring to FIG. 2, each of the trailer brake actuators includes a pair of casing members 24 and 26 having the peripheral portion of a diaphragm 28 clamped therebetween by a suitable clamping member 30. A cup-shaped member 30 is maintained in engagement with the diaphragm 28 by a spring 32 which is interposed between the member 30 and the end wall 33 of the casing 26. A push-plate 34 is secured at 36 to the member 30 and the latter is connected with a rod 38 which is suitably connected to a brake actuating rod 40. Diaphragm 28 cooperates with the casing member 24 to form a brake chamber 42, the latter being provided with a suitable inlet opening 44 which is connected to the conduit 16 or 18. With such an arrangement, it will readily be understood that as soon as the chamber 42 is charged with compressed air, the diaphragm 28 and brake actuating rod 40 will be moved to the right, as viewed in FIG. 2, for applying the trailer brakes.

The present invention includes a brake locking means 46 for locking the rods 38 and 40 in brake applied position under certain conditions of operation. Such locking means may be constructed as illustrated in the application of Harry M. Valentine Serial No. 121,970, filed July 5, 1961, for Brake Mechanism with Mechanical Lock, such application being owned by the same assignee. More particularly, the brake locking means 46 includes a plurality of locking rollers 48 which are interposed between a cam ring 50 and the rod 38, the locking rollers being normally urged into locking position by means of a spring 52. In this position, brake applying movement of the rod 38 to the right may take place. However, any movement to the left, corresponding to brake releasing movement, is prevented since the locking rollers become firmly wedged between the ring 50 and the rod 38 through the action of the spring 52. Thus, after the brake has been applied, the locking rollers 48 prevent brake releasing movement of the rod 38.

Means are provided for maintaining the locking rollers 48 in released position and preferably such means is controlled by fluid pressure. As shown, a fluid pressure control or release means 54 includes a cylinder 56 in which a deformable annular piston 58 of suitable plastic material is housed and positioned between an O-ring seal 60 and the rollers 48, the cylinder including a lock release chamber 62 to which fluid pressure may be conducted by way of a lock port 64 and a duct 66 formed in the end wall 33 of the casing member 36. Thus, when the chamber 62 is charged with fluid pressure of a predetermined magnitude, piston 58 is effective to move the locking rollers 48 to the right against the tension of the spring 52 to relieve the locking effect of the rollers upon the rod 38 and allow movement of the latter in opposite directions for brake application and release. On the other hand, when the chamber 62 is exhausted, or the pressure therein drops to a predetermined magnitude of the order of 40 p.s.i. for example, the spring 52 is effective to move the rollers 48 into locking position and prevent any movement of the rod 38 to the left as above described.

Referring again to FIG. 1, a novel arrangement is utilized by the present invention for controlling the operation of the locking rollers 48. As shown, such means includes a control valve 70 provided with a manually controlled plunger 72, the valve including inlet, outlet and exhaust ports 74, 76 and 78 respectively. The inlet port 74 is connected with the trailer reservoir 8 by means of a conduit 80. Outlet port 76 is connected with the lock ports 64 of the actuators 20 and 22 as by means of a conduit 82, a small volume reservoir 84 and conduits 86 and 88. Exhaust port 78 is connected with the emergency conduit 4 as by means of a conduit 90.

Valve 70 is more particularly illustrated in FIG. 3 and includes a casing 92 in which the valve plunger 72 is mounted for axial movement in opposite directions. In the position illustrated, the plunger 72 occupies its normal upward position wherein a valve member 94 is moved upwardly to contact an abutment 96, the valve member 94 thus establishing communication between the inlet port 74 and the outlet port 76 by way of interconnected inlet chamber 98 and outlet chamber 99. It will also be observed that when the valve 70 occupies the normal position shown in FIG. 3, the inlet port 74 is disconnected from the exhaust port 78 by means of an O-ring exhaust valve 100 which is carried by the lower portion of the plunger 72, the O-ring 100 sealingly engaging a bore 102. When the valve control plunger 72 is moved downwardly however, an annular valve part 104 of the valve member 94 engages a valve seat 106 to close communication between the inlet and outlet ports 74 and 76, while the exhaust valve 100 will be moved into an enlarged bore 108 in order to connect the inlet port 74 and inlet chamber 98 with the exhaust port 78.

From the foregoing, it will be observed that the valve 70 is a two-way valve which is stable in either its upper or lower positions. In the upper position, the inlet port 74 is connected with the outlet port 76. In the lower position, communication between these ports is interrupted and the inlet port 74 is connected with the exhaust port 78.

In the normal operation of the trailer brake system heretofore described, the valve control plunger 72 is moved to its upper position which serves to connect the inlet port 74 with the outlet port 76. With the tractor and trailer vehicles coupled, fluid pressure will be conducted from the trailer reservoir 8 to the lock release means 54 by way of conduit 80, valve 70, conduit 82, volume reservoir 84 and conduits 86 and 88. Thus, during normal operation of the coupled vehicles, the locking rollers 48 will be ineffective and service application of the actuators 20 and 22 may be effected in the usual manner by charging the service conduit 12 by operation of the tractor brake valve.

In the event the trailer is uncoupled from the tractor, it will be understood that an emergency application of the trailer actuators 20 and 22 will occur by reason of the conventional operation of the relay emergency valve 6. However, due to the charging of the lock release means 54 of the actuators, due to the open position of the valve 70, the trailer brake actuators will not be held in locked condition. Thus, the trailer brakes will be automatically applied in the usual manner whether the vehicles are manually uncoupled or whether there is a break-in-two.

Assuming that the trailer is uncoupled from the tractor and that the trailer brakes are applied as above stated, in the event that the trailer system pressure drops to approximately 40 p.s.i. for example, the brake locking means 46 will be effective through the action of the spring 52 to lock the rod 38 in its brake applied position. Thus, an automatic parking of the trailer will be secured as soon as the trailer brake system pressure drops to substantially the aforementioned value.

In the event that the trailer brakes are automatically applied, as above stated, and it is desired to release the brake application, it is only necessary to move the plunger 72 of the valve 70 to its lower position. This serves to close the valve 94 upon its seat 106 and thus maintain the locking rollers 48 in released position due to the fluid pressure which is trapped within lock releasing means 54. At the same time, trailer reservoir 8 is connected to atmosphere through the open emergency conduit 4 by way of conduit 80, inlet port 74, open exhaust valve 100, exhaust port 78 and conduit 90. As the pressure in the trailer reservoir 8 is depleted, it will be understood that the pressure within the actuators 20 and 22 will also be exhausted to atmosphere through the relay emergency valve 6 and the reservoir 8. Thus, the trailer brake application may be released without the necessity of recoupling the trailer with the tractor.

It will be noted that as the plunger 72 of the valve 70 is moved to its lower position, the outlet port 76 as well as the connections to the lock release means 54 are momentarily connected with the exhaust port 78 due to the opening of the exhaust valve 100 prior to seating of the valve member 94 upon its seat 106. This momentary connection might release sufficient pressure from the lock release means so that the magnitude of the pressure remaining in the lock release chamber 62 might be such that the locking rollers would be effective to lock a partial application of the brakes. This contingency is avoided by the use of the volume reservoir 84 which insures that sufficient pressure will remain in the chamber 62 as to maintain the brake locking means 46 in released condition as the plunger 72 is moved downwardly. Thus, the brake application on the trailer may be completely released by merely moving the valve control plunger 72 to its lower position.

In the event that the trailer brakes are released as just set forth, recoupling of the trailer with the tractor will automatically move the valve 70 to its upper position, this being due to the action of full reservoir pressure from the tractor to the trailer which is effective upon the area of the closed valve 94 to move the latter upwardly. This operation restores the valve 70 to the position shown in FIG. 3, so that as the pressure in the trailer reservoir 8 is restored, through the operation of the relay emergency valve 6, such pressure is conducted through the open valve 70 to the lock release means 54 to release any locking action of the rollers 48. Thus, the system is automatically restored to its normal condition for the over-the-road operation.

From the foregoing, it will be readily understood that the present invention provides a novel safety and parking brake construction for trailers which is effective to lock the trailer brakes in applied condition in the event that the trailer is uncoupled from the tractor and the trailer reservoir pressure drops to a predetermined value. Even though the invention includes a brake locking construction, the arrangement is nevertheless such, that the locking device will not interfere in any way with the conventional automatic trailer brake application when the trailer is uncoupled from the tractor.

A further feature comprises the use of the control valve and system arrangement including the volume reservoir, which enables a trailer brake application to be readily released without danger of the trailer brakes becoming locked in a partially applied condition. The invention is moreover such that the system is automatically restored to its normal condition in the event that the operator leaves the control valve in its brake-released position, this being achieved by the automatic pressure-responsive movement of the control valve when the vehicles are recoupled. Under such conditions, the brake locking mechanism is automatically released as soon as the trailer reservoir pressure builds up to a value sufficient to charge the lock release mechanism to a value of the order of 60 p.s.i.

While a preferred embodiment of the invention has been shown and described herein with considerable particularity, it will be readily understood by those skilled in the art that various modifications may be resorted to without departing from the spirit of the invention. Reference will therefore be had to the appended claims for a definition of the limits of the invention.

What is claimed is:

1. A fluid pressure safety brake system for a trailer of the type having a brake actuator for actuating a trailer brake, a relay emergency valve and a fluid pressure reservoir chargeable with fluid under pressure through an emergency line when the latter is connected with a tractor and operative to charge the brake actuator with fluid under pressure when the emergency line is disconnected from the tractor to effect an emergency application of the trailer brake, comprising spring-applied brake locking means for locking said actuator in brake applied position when the pressure in said reservoir drops to a predetermined value, fluid pressure operated release means for maintaining said locking means in released condition when the pressure in said reservoir is above said predetermined value, and control valve means movable to a first normal position connecting said reservoir and said release means to maintain said locking means in released condition to prevent the locking of an emergency application of the trailer brake when the trailer emergency line is disconnected from the tractor, subsequent drop in the pressure in said reservoir to said predetermined value enabling operation of said locking means to lock the brake actuator in brake applied position.

2. A fluid pressure safety brake system as set forth in claim 1 wherein, when the trailer emergency line is disconnected from the tractor to effect an emergency application of the trailer brake, said control valve means is movable from said normal position to a second position to trap fluid pressure in said release means and to connect said reservoir with the emergency line to release the emergency application of the trailer brake.

3. A fluid pressure safety brake system as set forth in claims 2 which includes in addition, a volume reservoir in the connection between the control valve means and the release means to prevent a decrease in the pressure of the fluid in said release means during movement of the control valve means from said normal position to said second position.

4. A fluid pressure safety brake system as set forth in claim 2 wherein said valve means includes a pressure responsive part subject to the fluid pressure in said emergency line, when the latter is reconnected with a tractor, for automatically moving said valve means from said second to said normal position.

5. A fluid pressure safety brake system as set forth in claim 2 wherein the control valve means includes a casing having inlet, outlet and exhaust ports, a conduit connecting said reservoir with said inlet port, conduit means connecting said outlet port and release means, a conduit connecting said exhaust port and emergency line, and said valve means including also a pair of interconnected valve elements, one of said elements connecting said inlet and outlet ports and the other element closing said exhaust port when the valve means is moved to said first normal position, said one element disconnecting said inlet and outlet ports and said other element connecting said inlet and exhaust ports when the valve means is moved to said second position.

6. A fluid pressure safety brake system as set forth in claim 2 wherein said conduit means includes a volume reservoir to prevent a decrease in the pressure of the fluid in said release means during movement of the control valve means from said normal position to said second position.

References Cited by the Examiner

UNITED STATES PATENTS 3,037,819 6/62 Sukala _____ 303—89

FOREIGN PATENTS 331,787 11/35 Italy.

EUGENE G. BOTZ, *Primary Examiner.*

FERGUS S. MIDDLETON, *Examiner.*